United States Patent
Tode et al.

(10) Patent No.: US 9,450,269 B2
(45) Date of Patent: Sep. 20, 2016

(54) NONAQUEOUS ELECTROLYTE SECONDARY BATTERY

(71) Applicant: SANYO Electric Co., Ltd., Moriguchi-shi, Osaka (JP)

(72) Inventors: Shingo Tode, Kasai (JP); Toyoki Fujihara, Kanzaki-gun (JP); Toshiyuki Nohma, Kakogawa (JP)

(73) Assignee: SANYO Electric Co., Ltd., Dalto-shi (JP)

( * ) Notice: Subject to any disclaimer, the term of this patent is extended or adjusted under 35 U.S.C. 154(b) by 269 days.

(21) Appl. No.: 13/962,037

(22) Filed: Aug. 8, 2013

(65) Prior Publication Data

US 2015/0044533 A1 Feb. 12, 2015

(51) Int. Cl.
| | |
|---|---|
| *H01M 10/0587* | (2010.01) |
| *H01M 2/14* | (2006.01) |
| *H01M 2/22* | (2006.01) |
| *H01M 10/052* | (2010.01) |
| *H01M 10/0525* | (2010.01) |
| *H01M 10/0568* | (2010.01) |
| *H01M 2/02* | (2006.01) |

(52) U.S. Cl.
CPC ............ *H01M 10/052* (2013.01); *H01M 2/14* (2013.01); *H01M 2/22* (2013.01); *H01M 10/0525* (2013.01); *H01M 10/0568* (2013.01); *H01M 10/0587* (2013.01); *H01M 2/0217* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 5,439,760 A | 8/1995 | Howard et al. |
| 6,040,082 A | 3/2000 | Haas et al. |

(Continued)

FOREIGN PATENT DOCUMENTS

| JP | 10-340740 A | 12/1998 |
| JP | 2000268877 A | 9/2000 |

(Continued)

OTHER PUBLICATIONS

Final Office Action dated Jan. 11, 2016, issued in U.S. Appl. No. 13/961,994 (32 pages).

(Continued)

*Primary Examiner* — Jonathan Crepeau
(74) *Attorney, Agent, or Firm* — Westerman, Hattori, Daniels & Adrian, LLP (57) ABSTRACT

A prismatic nonaqueous electrolyte secondary battery includes a flat winding electrode assembly formed by winding an elongated positive and negative electrodes with an elongated separator interposed therebetween, and an outer body storing the flat winding electrode assembly and a nonaqueous electrolyte. The positive electrode includes a positive electrode substrate exposed portion formed along a longitudinal direction. The negative electrode includes a negative electrode substrate exposed portion formed along a longitudinal direction. The nonaqueous electrolyte contains at least one of a lithium salt having an oxalate complex as an anion and lithium difluorophosphate ($LiPF_2O_2$) at the time of making the nonaqueous electrolyte secondary battery. The flat winding electrode assembly has eight or more layers of a winding portion formed only of the separator in its central portion. This battery can allow a nonaqueous electrolyte having a high viscosity to easily penetrate the inside of a flat winding electrode assembly.

20 Claims, 6 Drawing Sheets

(56) References Cited

U.S. PATENT DOCUMENTS

| | | |
|---|---|---|
| 6,365,299 B1 * | 4/2002 | Miyaki et al. ............ 429/218.1 |
| 7,255,965 B2 * | 8/2007 | Xu et al. ..................... 429/337 |
| 9,093,718 B2 | 7/2015 | Dietz et al. |
| 9,112,236 B2 | 8/2015 | Miyagi et al. |
| 2004/0048152 A1 | 3/2004 | Yata et al. |
| 2006/0166078 A1 | 7/2006 | Chen et al. |
| 2009/0233168 A1 | 9/2009 | Yoshida |
| 2009/0286155 A1 | 11/2009 | Takehara |
| 2010/0015514 A1 | 1/2010 | Miyagi et al. |
| 2010/0116533 A1 | 5/2010 | Ishimatsu et al. |
| 2010/0203373 A1 | 8/2010 | Kawase et al. |
| 2010/0216001 A1 | 8/2010 | Byun et al. |
| 2010/0323240 A1 | 12/2010 | Tsujioka et al. |
| 2011/0052976 A1 | 3/2011 | Ishii et al. |
| 2011/0111267 A1 | 5/2011 | Van Schyndel |
| 2011/0183197 A1 | 7/2011 | Byun et al. |
| 2011/0195286 A1 | 8/2011 | Aota et al. |
| 2012/0021264 A1 | 1/2012 | Morishima |
| 2012/0079713 A1 | 4/2012 | Hosokawa et al. |
| 2012/0129055 A1 | 5/2012 | Takahata et al. |
| 2012/0145428 A1 * | 6/2012 | Tokunaga et al. ............ 173/217 |
| 2012/0196178 A1 | 8/2012 | Kambayashi |
| 2012/0214037 A1 | 8/2012 | Hara et al. |
| 2012/0313570 A1 | 12/2012 | Ohtaniuchi et al. |
| 2014/0045016 A1 | 2/2014 | Okutani et al. |
| 2014/0045020 A1 | 2/2014 | Okutani et al. |
| 2014/0045021 A1 | 2/2014 | Okutani et al. |

FOREIGN PATENT DOCUMENTS

| | | |
|---|---|---|
| JP | 3439085 B2 | 8/2003 |
| JP | 2007-180015 A | 7/2007 |
| JP | 2007227367 | 9/2007 |
| JP | 2009-129541 A | 6/2009 |
| JP | 2010-108624 A | 5/2010 |
| JP | 2010-531856 A | 9/2010 |
| JP | 2010-287456 A | 12/2010 |
| JP | 2011-070932 A | 4/2011 |
| JP | 2011076785 A | 4/2011 |
| JP | 2011086406 A | 4/2011 |
| JP | 2012-79476 A | 4/2012 |
| JP | 2012084322 A1 | 4/2012 |
| WO | 2010116533 A1 | 10/2010 |
| WO | 2011016112 A1 | 2/2011 |

OTHER PUBLICATIONS

Office Action dated Sep. 3, 2015, issued in U.S. Appl. No. 13/961,994.

Office Action dated Jun. 5, 2015, issued in U.S. Appl. No. 13/962,217.

Office Action dated Oct. 5, 2015, issued in U.S. Appl. No. 13/962,101, (no translation).

Notice of Allowance Apr. 14, 2016, issued in U.S. Appl. No. 13/962,101 (35 pages).

* cited by examiner

NONAQUEOUS ELECTROLYTE SECONDARY BATTERY

TECHNICAL FIELD

The present invention relates to a nonaqueous electrolyte secondary battery that allows a nonaqueous electrolyte having a high viscosity to easily penetrate the inside of a flat winding electrode assembly.

BACKGROUND ART

Alkaline secondary batteries typified by nickel-hydrogen batteries and nonaqueous electrolyte secondary batteries typified by lithium ion batteries have been widely used as a power supply for driving portable electronic equipment, such as cell phones including smartphones, portable personal computers, PDAs, and portable music players. In addition, alkaline secondary batteries and nonaqueous electrolyte secondary batteries have been widely used as a power supply for driving electric vehicles (EVs) and hybrid electric vehicles (HEVs and PHEVs), and in stationary storage battery systems for suppressing output fluctuation of solar power generation and wind power generation, for example, and for a peak shift of system power that utilizes the power during the daytime while saving the power during the nighttime.

The use of EVs, HEVs, and PHEVs or the stationary storage battery system especially requires high capacity and high output characteristics. The size of each battery is therefore increased, and a plurality of batteries are connected in series or in parallel for use. Therefore, nonaqueous electrolyte secondary batteries have been generally used for these purposes in view of space efficiency. When physical strength is needed, a metal prismatic outer body with one side open, and a metal sealing plate for sealing this opening are generally adopted as an outer body of a battery.

Increasing longevity is essential in nonaqueous electrolyte secondary batteries used for the above-mentioned purposes. Therefore, various additives are added to a nonaqueous electrolyte in order to prevent degradation. For example, JP-A-2009-129541 discloses that, in a nonaqueous electrolyte secondary battery, a cyclic phosphazene compound and a salt having various oxalate complexes as an anion are added to a nonaqueous electrolyte. JP-T-2010-531856 and JP-A-2010-108624 describe adding lithium bis(oxalato)borate ($Li[B(C_2O_4)_2]$, hereinafter referred to as "LiBOB"), which is a lithium salt having an oxalate complex as an anion, as represented by the following structural formula (I).

(I)

Japanese Patent No. 3439085 discloses the invention of a nonaqueous electrolyte secondary battery in which lithium difluorophosphate ($LiPF_2O_2$) is added to a nonaqueous electrolyte in order to prevent self-discharge at charge storage and improve storage characteristics after charging.

When a cyclic phosphazene compound and a salt having various oxalate complexes as an anion disclosed in JP-A-2009-129541 are added to a nonaqueous electrolyte, fire resistance of the nonaqueous electrolyte is improved, which can provide a nonaqueous electrolyte secondary battery having excellent battery characteristics and high safety. When LiBOB disclosed in JP-T-2010-531856 and JP-A-2010-108624 is added to a nonaqueous electrolyte, a protective layer including a lithium ion conductive layer that is thin and extremely stable is formed on the surface of a carbon negative electrode active material of the nonaqueous electrolyte secondary battery. This protective layer is stable even in a high temperature, consequently preventing the carbon negative electrode active material from decomposing the nonaqueous electrolyte. This leads to an advantage of providing excellent cycling characteristics and improving the safety of a battery.

In the nonaqueous electrolyte secondary battery disclosed in Japanese Patent No. 3439085, $LiPF_2O_2$ and lithium react to form a high-quality protective covering on the interfaces of a positive electrode active material and a negative electrode active material. This protective covering prevents direct contact between an active material in a state of charge and an organic solvent, thereby preventing decomposition of a nonaqueous electrolyte due to the contact between the active material and the nonaqueous electrolyte and improving charge storage characteristics.

A nonaqueous electrolyte secondary battery having high capacity and high output characteristics uses a flat winding electrode assembly that is produced by winding a positive electrode with a large width, a negative electrode, and a separator. In a nonaqueous electrolyte secondary battery using such a flat winding electrode assembly that includes an electrode with a large width, a nonaqueous electrolyte is less likely to penetrate the winding electrode assembly in the width direction of the electrode and is even less likely to penetrate the inner periphery than the outer periphery. In particular, the viscosity of the nonaqueous electrolyte is high in a nonaqueous electrolyte secondary battery using a non-aqueous solvent that has a high content ratio of a cyclic carbonate or using a nonaqueous electrolyte that includes a lithium salt having an oxalate complex as an anion or $LiPF_2O_2$ added in the nonaqueous solvent. Consequently, the nonaqueous electrolyte is less likely to penetrate the inside of the flat winding electrode assembly. When a positive electrode, a negative electrode, and a separator are wound and then pressed to produce a flat winding electrode assembly, the positive electrode, the negative electrode, and the separator closely contact each other, and the effect of the viscosity of the nonaqueous electrolyte can be clearly seen.

SUMMARY

An advantage of some aspects of the invention is to provide a nonaqueous electrolyte secondary battery which allows a nonaqueous electrolyte to easily penetrate a central portion of a flat winding electrode assembly so that it does not take a long time to pore the nonaqueous electrolyte even if the nonaqueous electrolyte contains lithium salt having an oxalate complex as an anion or $LiPF_2O_2$ added in a nonaqueous solvent.

A nonaqueous electrolyte secondary battery according to an aspect of the invention includes: a flat winding electrode assembly formed by winding an elongated positive electrode and an elongated negative electrode with an elongated separator interposed therebetween; and an outer body storing the flat winding electrode assembly and a nonaqueous electrolyte. The nonaqueous electrolyte contains at least one of a lithium salt having an oxalate complex as an anion and a lithium difluorophosphate at the time of making the nonaqueous electrolyte secondary battery. The flat winding electrode assembly has 8 or more layers of a winding portion formed only of the separator in its central portion.

The nonaqueous electrolyte is less likely to penetrate the flat winding electrode assembly in the width direction of the electrode and is less likely to penetrate the central portion thereof. Furthermore, the viscosity of the nonaqueous electrolyte is high when at least one of a lithium salt having an oxalate complex as an anion and $LiPF_2O_2$ is contained in the nonaqueous electrolyte. Thus, the nonaqueous electrolyte is less likely to penetrate the central portion of the flat winding electrode assembly. In the nonaqueous electrolyte secondary battery of the invention, the flat winding electrode assembly has 8 or more layers of the winding portion formed only of the separator in its central portion. Therefore, the nonaqueous electrolyte having a high viscosity is likely to penetrate the central portion of the flat winding electrode assembly. In addition, an extra nonaqueous electrolyte existing outside the flat winding electrode assembly is likely to be introduced into the flat winding electrode assembly when the nonaqueous electrolyte becomes insufficient at the charge and discharge. Thus, in the nonaqueous electrolyte secondary battery of the invention, the effect of adding the lithium salt having the oxalate complex as the anion or $LiPF_2O_2$ to the nonaqueous electrolyte can be successfully attained.

Two sheets of the separator are generally used to form the flat winding electrode assembly while the positive electrode and the negative electrode are insulated from each other with the separator interposed therebetween. Thus, 8 or more layers of the winding portion formed only of the separator are formed in the central portion of the flat winding electrode assembly by winding two sheets of the separator twice or more. Start positions of winding of two sheets of the separator may be different and the number of stacked layers of each sheet of the separator may be different from each other, as long as the total number of stacked layers of the separator is 8 or more layers. When this winding portion formed only of the separator has less than 8 layers, the nonaqueous electrolyte is less likely to penetrate the central portion of the flat winding electrode assembly as the number of the layers decreases. The upper limit of the number of the layers of the winding portion formed only of the separator is optional, but it is preferably around 12 layers.

A compound capable of reversibly absorbing and desorbing lithium ions may be selected to be used as appropriate as the positive electrode active material that can be used in the nonaqueous electrolyte secondary battery of the invention. Such electrode active materials include lithium transition-metal composite oxides that are represented by $LiMO_2$ (M is at least one of Co, Ni, and Mn) and are capable of reversibly absorbing and desorbing lithium ions, namely, $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiMn_2O_4$, or $LiFePo_4$. Such lithium transition-metal composite oxides may be used alone, or two or more of them may be mixed to be used. Furthermore, lithium cobalt composite oxides with different metal element such as zirconium, magnesium, and aluminium added thereto may be used as well.

The following shows examples of a nonaqueous solvent that can be used for the nonaqueous electrolyte in the nonaqueous electrolyte secondary battery of the invention: a cyclic carbonate such as ethylene carbonate (EC), propylene carbonate (PC), and butylene carbonate (BC); a fluorinated cyclic carbonate; a cyclic carboxylic ester such as γ-butyrolactone (γ-BL) and γ-valerolactone (γ-VL); a chain carbonate such as dimethyl carbonate (DMC), ethyl methyl carbonate (EMC), diethyl carbonate (DEC), methylpropyl carbonate (MPC), and dibutyl carbonate (DBC); fluorinated chain carbonate; a chain carboxylic ester such as methyl pivalate, ethyl pivalate, methyl isobutyrate, and methyl propionate; an amide compound such as N,N'-dimethylformamide and N-methyl oxazolidinone; and a sulfur compound such as sulfolane. It is desirable that two or more of them be mixed to be used.

In the nonaqueous electrolyte secondary battery of the invention, the lithium salt that is commonly used as an electrolyte salt for an nonaqueous electrolyte secondary battery may be used as the electrolyte salt dissolved in the nonaqueous solvent. Examples of such a lithium salt are as follows: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of these substances. In particular, among them, it is preferable that $LiPF_6$ (lithium hexafluorophosphate) be used. The amount of dissolution of the electrolyte salt with respect to the nonaqueous solvent is preferably from 0.8 to 1.5 mol/L.

In the nonaqueous electrolyte secondary battery of the invention, the lithium salt having the oxalate complex as an anion is preferably contained in the nonaqueous electrolyte in an amount of 0.01 to 2.0 mol/L, more preferably from 0.05 to 0.2 mol/L at the time of making the nonaqueous electrolyte secondary battery. Furthermore, in the nonaqueous electrolyte secondary battery of the invention, $LiPF_2O_2$ is preferably contained in the nonaqueous electrolyte in an amount of 0.01 to 2.0 mol/L, more preferably 0.01 to 0.1 mol/L at the time of making the nonaqueous electrolyte secondary battery. In the nonaqueous electrolyte secondary battery of the invention, the additive amount of the lithium salt having the oxalate complex as an anion or $LiPF_2O_2$ in the nonaqueous electrolyte may be added as the electrolyte salt whose principal element is the lithium salt having the oxalate complex as an anion or $LiPF_2O_2$. However, a large additive amount of the lithium salt having the oxalate complex as an anion or $LiPF_2O_2$ in the nonaqueous electrolyte increases the viscosity of the nonaqueous electrolyte. Therefore, various electrolyte salts as above may be used as principal elements, and the lithium salt having the oxalate complex as an anion or $LiPF_2O_2$ may be added as an additive substance in a small amount, for example, about 0.1 mol/L. When the lithium salt having the oxalate complex as an anion or $LiPF_2O_2$ is added as the additive substance, depending on the additive amount thereof, all of the lithium salt having the oxalate complex as an anion or $LiPF_2O_2$ is consumed for forming the protective covering on the positive electrode or negative electrode at the initial charge. This might lead to a case in which no lithium salt having the oxalate complex as an anion or $LiPF_2O_2$ is substantially in the nonaqueous electrolyte. The invention also includes this case. Thus, the invention includes any case in which the nonaqueous electrolyte of the nonaqueous electrolyte secondary battery before the initial charge contains the lithium salt having the oxalate complex as an anion or $LiPF_2O_2$.

In the nonaqueous electrolyte secondary battery of the invention, it is preferable that the positive electrode include a positive electrode substrate exposed portion formed along a longitudinal direction, that the negative electrode include a negative electrode substrate exposed portion formed along a longitudinal direction, that the flat winding electrode assembly include the positive electrode substrate exposed portion wound on one end and the negative electrode substrate exposed portion wound on the other end, that at least one of the positive electrode substrate exposed portion and the negative electrode substrate exposed portion be welded with a collector, and a welded portion between the at least one of the positive electrode substrate exposed portion and the negative electrode substrate exposed portion and the collector be deviated from the winding central axis of the winding electrode assembly.

Such a structure allows the nonaqueous electrolyte to easily penetrate the central portion of the winding electrode assembly through a region corresponding to the winding central axis.

In the nonaqueous electrolyte secondary battery of the invention, it is preferable that the outer body include a bottomed prismatic hollow case having an opening portion and a sealing plate sealing the opening portion, and the welded portion be located at one point and be deviated from the winding central axis of the winding electrode assembly to the sealing plate side.

Such a structure allows the nonaqueous electrolyte to easily penetrate the central portion of the winding electrode assembly through the region corresponding to the winding central axis and a region on the bottom side of the outer body.

In the nonaqueous electrolyte secondary battery of the invention, it is preferable that the outer body include a bottomed prismatic hollow case having an opening portion and a sealing plate sealing the opening portion, and the welded portion be located at two points and be each deviated from the winding central axis of the flat winding electrode assembly to the sealing plate side and to the bottom side of the prismatic outer body.

Such a structure allows the nonaqueous electrolyte to easily penetrate the central portion of the winding electrode assembly through the region corresponding to the winding central axis.

In the nonaqueous electrolyte secondary battery of the invention, it is preferable that the winding number of the positive electrode and the negative electrode be each 30 or more. In addition, it is preferable that the battery capacity be 20 Ah or more.

When the winding number of the positive electrode and the negative electrode are large, the nonaqueous electrolyte is less likely to penetrate the central portion of the flat winding electrode assembly. When the battery capacity is high, even if the winding number of the positive electrode and the negative electrode are small, the nonaqueous electrolyte is less likely to penetrate the central portion of the flat winding electrode assembly in the width direction of the electrode. Therefore, the above-mentioned effect of the invention can be better seen when the winding number of the positive electrode and the negative electrode are large or the battery capacity is high.

In the nonaqueous electrolyte secondary battery of the invention, it is preferable that the lithium salt having the oxalate complex as an anion be lithium bis(oxalato)borate (Li[B(C$_2$O$_4$)$_2$], hereinafter referred to as "LiBOB").

Using LiBOB as the lithium salt having the oxalate complex as an anion provides the nonaqueous electrolyte secondary battery capable of attaining further preferable cycling characteristics. LiBOB is preferably contained in an amount of 0.01 to 2.0 mol/L, more preferably 0.05 to 0.2 mol/L, at the time of making the nonaqueous electrolyte secondary battery.

In the invention, it is preferable that the negative electrode include a negative electrode substrate exposed portion formed on both ends thereof in a width direction along a longitudinal direction. In such a case, it is preferable that one of the negative electrode substrate exposed portions be wider than the other, and the wider substrate exposed portion be connected to the negative electrode collector.

Such a structure allows heat generated inside the electrode assembly to be easily released from both ends in the width direction of the negative electrode substrate exposed portion and prevents an increase in temperature inside the electrode assembly.

It is preferable that at least one of the positive electrode and the negative electrode have a protective layer including a metal oxide particle and a binder formed on a surface thereof. It is preferable that alumina, titania, zirconia, and the like be used as the metal oxide and that an acrylate resin be used as the binder.

Moreover, in the invention, it is preferable that the negative electrode include a negative electrode substrate exposed portion formed on both ends thereof in a width direction along a longitudinal direction, that the negative electrode have a protective layer including a metal oxide particle and a binder formed on a surface thereof, and that the protective layer be formed on both ends of the negative electrode in the width direction along a longitudinal direction and be formed onto both surfaces of the negative electrode substrate exposed portion.

In such a structure, the protective layer has porous and insulating properties due to the presence of the metal oxide particle. Consequently, a tiny gap is formed between the negative electrode and the separator, and whereby the nonaqueous electrolyte is more likely to penetrate the central portion of the winding electrode assembly. In addition, such a structure leads to excellent insulating properties between the negative electrode substrate exposed portion and the positive electrode substrate exposed portion facing each other with the separator interposed therebetween, thereby obtaining a nonaqueous electrolyte secondary battery that has excellent reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Various embodiments of the invention will be described below in detail with reference to the accompanying drawings. However, the embodiments described below are merely illustrative examples for understanding the technical spirit of the invention and are not intended to limit the invention to the embodiments. The invention may be equally applied to various modifications without departing from the technical spirit described in the claims.

Embodiment 1

Figure 1A:
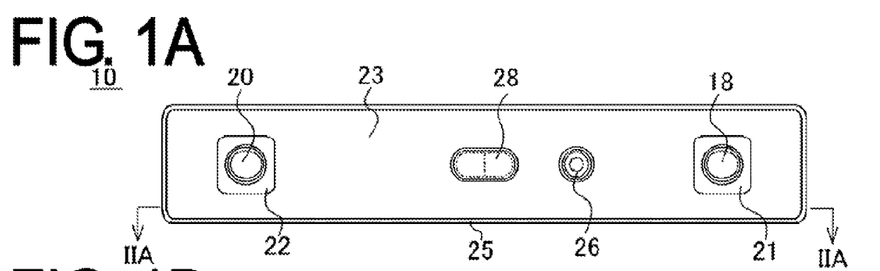
FIG. 1A is a plan view of a prismatic nonaqueous electrolyte secondary battery in accordance with Embodiment 1.
Figure 1B:
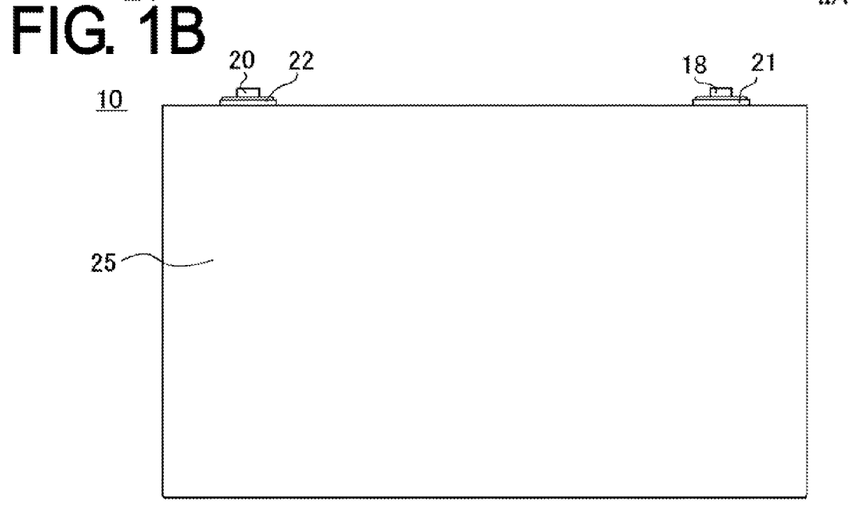
FIG. 1B is a front view thereof.

First, a prismatic nonaqueous electrolyte secondary battery in accordance with Embodiment 1 will be described with reference to FIGS. 1 to 3. As shown in FIG. 3, this nonaqueous electrolyte secondary battery 10 includes a flat winding electrode assembly 14. In the electrode assembly 14, a positive electrode 11 and a negative electrode 12 are wound while being insulated from each other with a separator 13 interposed therebetween. The flat winding electrode assembly 14 has its outermost side covered with the separator 13 and has the negative electrode 12 disposed on a further outer side than the positive electrode 11. Two sheets of the separator are generally used to form the flat winding electrode assembly 14 while the positive electrode 11 and the negative electrode 12 are insulated from each other with the separator 13 interposed therebetween. Here, the flat winding electrode assembly 14 has only two sheets of the separator 13 wound twice to form stacked eight layers of separators in total in its central portion so that the a nonaqueous electrolyte is likely to penetrate the inside thereof. "CP" in FIG. 3 represents the winding central position of the flat winding electrode assembly 14.

A positive electrode 11 is produced by the following process: a positive electrode active material mixture is applied onto both sides of a positive electrode substrate 11*b* of aluminum foil; the resultant object is dried and extended by applying pressure; and the positive electrode 11 is slit so as to expose the aluminum foil in a strip along the end of one side in the wide direction. The part of the aluminum foil exposed in a strip is a positive electrode substrate exposed portion 15. A negative electrode 12 is produced by the following process: a negative electrode active material mixture is applied onto both sides of a negative electrode substrate 12*b* of copper foil; the resultant object is dried and extended by applying pressure; and the negative electrode 12 is slit so as to expose the copper foil in a strip along the end of one side in the wide direction. The part of the copper foil exposed in a strip is a negative electrode substrate exposed portion 16.

The width and length of a negative electrode active material mixture layer 12*a* of the negative electrode 12 are larger than those of a positive electrode active material mixture layer 11*a*. It is preferable that the positive electrode substrate be formed using foil of aluminum or aluminum alloy having a thickness of about from 10 to 20 μm, while the negative electrode substrate be formed using foil of copper or copper alloy having a thickness of about from 5 to 15 μm. A specific composition of the positive electrode active material mixture layer 11*a* and the negative electrode active material mixture layer 12*a* will be described later.

Figure 2A:
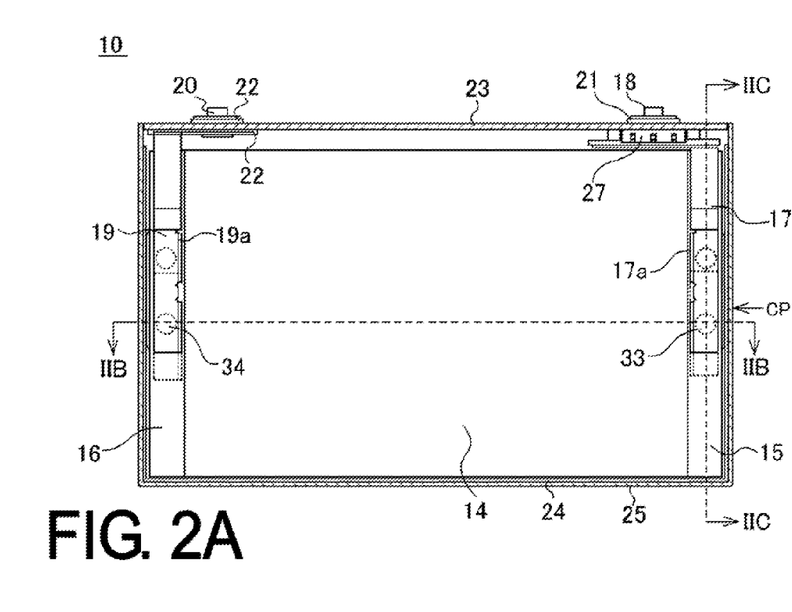
FIG. 2A is a fragmentary sectional view along line IIA-IIA of FIG. 1A.
Figure 2B:
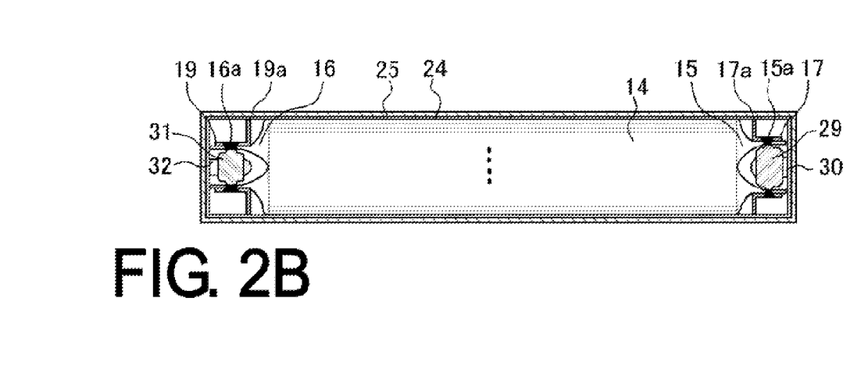
FIG. 2B is a fragmentary sectional view along line IIB-IIB of FIG. 2A.
Figure 3:
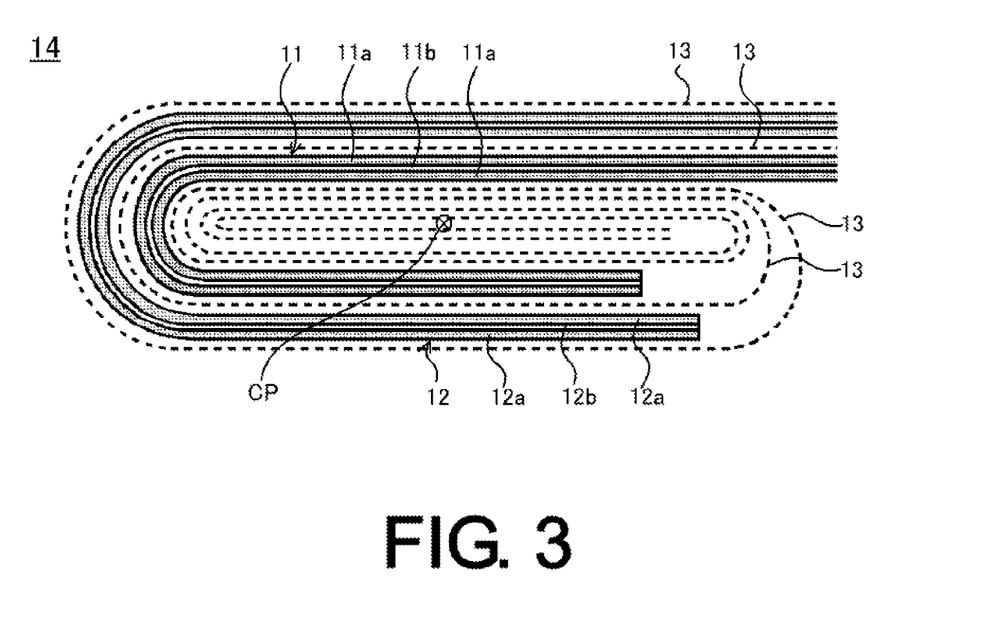
FIG. 3 is an enlarged sectional view of a winding central portion of a flat winding electrode assembly used in the prismatic nonaqueous electrolyte secondary battery in accordance with Embodiment 1.

As shown in FIGS. 2A and 2B, the flat winding electrode assembly 14 having a plurality of stacked layers of the positive electrode substrate exposed portion 15 on one end and a plurality of stacked layers of the negative electrode substrate exposed portion 16 on the other end is produced by the following process: the positive electrode 11 and the negative electrode 12 produced as above are displaced so that the aluminum foil exposed portion of the positive electrode 11 and the copper foil exposed portion of the negative electrode 12 are not overlapped by the active material mixture layers of the opposing electrodes; and the positive electrode 11 and the negative electrode 12 are wound while being insulated from each other with a separator 13 interposed therebetween. A microporous polyolefin membrane is preferably used as the separator 13.

The stacked layers of the positive electrode substrate exposed portion 15 are electrically connected to a positive electrode terminal 18 of aluminum material with a positive electrode collector 17 of aluminum material interposed therebetween. Likewise, the stacked layers of the negative electrode substrate exposed portion 16 are electrically connected to a negative electrode terminal 20 of copper material with a negative electrode collector 19 of copper material interposed therebetween. As shown in FIGS. 1A, 1B, and 2A, the positive electrode terminal 18 and the negative electrode terminal 20 are fixed to a sealing plate 23 of aluminum material or other material with insulating members 21 and 22, respectively, interposed therebetween. Where appropriate, the positive electrode terminal 18 and the negative electrode terminal 20 are connected to an external positive electrode terminal and an external negative electrode terminal (neither shown in the drawings), respectively.

The flat winding electrode assembly 14 produced as above is inserted into a prismatic outer body 25 of aluminum material or other material with one side thereof open with an insulating resin sheet 24 interposed in the periphery except for the sealing plate 23 side. The sealing plate 23 is then fitted to an opening portion of the prismatic outer body 25, and a fitting portion between the sealing plate 23 and the prismatic outer body 25 is laser-welded. Moreover, a nonaqueous electrolyte is poured through an electrolyte pour hole 26, and then the electrolyte pour hole 26 is sealed. Consequently, the nonaqueous electrolyte secondary battery 10 of Embodiment 1 is produced.

A current interruption mechanism 27 operated by a gas pressure generated inside the battery is provided between the positive electrode collector 17 and the positive electrode terminal 18. A gas exhaust valve 28 that is open when a gas pressure higher than the working pressure of the current interruption mechanism 27 is applied is also provided on the sealing plate 23. Therefore, the inside of the nonaqueous electrolyte secondary battery 10 is sealed. The nonaqueous electrolyte secondary battery 10 alone may be used, or a plurality of nonaqueous electrolyte secondary batteries 10 connected in series or in parallel may be used for various purposes. When a plurality of nonaqueous electrolyte secondary batteries 10 connected in series or in parallel are used, the external positive electrode terminal and the external negative electrode terminal may be provided separately to connect the respective batteries with a bus bar. The flat winding electrode assembly 14 used in the prismatic nonaqueous electrolyte secondary battery 10 of Embodiment 1 is used when high capacity of 20 Ah or more and high output characteristics are required. For example, the winding number of the positive electrode 11 is 43, in other words, the total number of stacked layers of the positive electrode 11 is 86.

When the total number of stacked layers of the positive electrode substrate exposed portion 15 or the negative electrode substrate exposed portion 16 is large, a large amount of welding current is needed to form a weld mark 15*a* or 16*a* passing through the whole stacked layer portions of the stacked positive electrode substrate exposed portion 15 or the negative electrode substrate exposed portion 16 in resistance-welding the positive electrode collector 17 and the negative electrode collector 19 to the positive electrode substrate exposed portion 15 and the negative electrode substrate exposed portion 16, respectively.

Figure 2C:
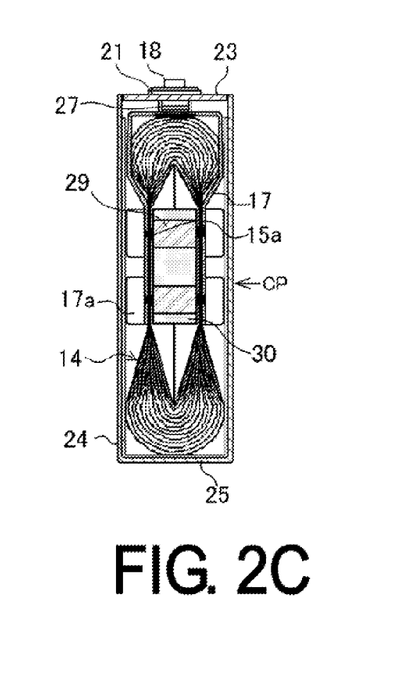
FIG. 2C is a sectional view along line IIC-IIC of FIG. 2A.

As shown in FIGS. 2A to 2C, in the positive electrode 11, the stacked positive electrode substrate exposed portion 15 is divided into two segments, and a positive electrode intermediate member 30 is interposed therebetween. The positive electrode intermediate member 30 is made of resin material and holds a plurality of positive electrode conductive members 29, here, two positive electrode conductive members 29. Likewise, in the negative electrode 12, the stacked positive electrode substrate exposed portion 16 is divided into two segments, and a negative electrode intermediate member 32 is interposed therebetween. The negative electrode intermediate member 32 is made of resin material and holds two negative electrode conductive members 31. The positive electrode collector 17 is disposed on the surfaces of both sides of the outermost side of the two segments of the positive electrode substrate exposed portion 15 that are disposed on both sides of the positive electrode conductive members 29. The negative electrode collector 19 is disposed on the surfaces of both sides of the outermost side of the two segments of the negative electrode substrate exposed portion 16 that are disposed on both sides of the negative electrode conductive members 31. The positive electrode conductive members 29 are made of aluminum material as with the positive electrode substrate, and the negative electrode conductive members 31 are made of copper material as with the negative electrode substrate. The shape of the positive electrode conductive members 29 and the negative electrode conductive members 31 may be either the same or different.

When the positive electrode substrate exposed portion 15 or the negative electrode substrate exposed portion 16 is divided into two segments, welding current needed to form a weld mark 15a or 16a passing through the whole stacked layer portion of the stacked positive electrode substrate exposed portion 15 or the negative electrode substrate exposed portion 16 is small compared to a case in which there is no division. This prevents sputters during resistance welding, thereby preventing a trouble such as an internal short in the winding electrode assembly 14 due to the sputters. Thus, the resistance welding is performed between the positive electrode collector 17 and the positive electrode substrate exposed portion 15 and between the positive electrode substrate exposed portion 15 and the positive electrode conductive members 29. Resistance welding is also performed between the negative electrode collector 19 and the negative electrode substrate exposed portion 16 and between the negative electrode substrate exposed portion 16 and the negative electrode conductive members 31. FIG. 2 shows two weld marks 33 formed by resistance-welding in the positive electrode collector 17 and two weld marks 34 formed by resistance-welding in the negative electrode collector 19.

The resistance-welding methods with the positive electrode intermediate member 30 including the positive electrode substrate exposed portion 15, the positive electrode collector 17, and the positive electrode conductive members 29, and with the negative electrode intermediate member 32 including the negative electrode substrate exposed portion 16, the negative electrode collector 19, and the negative electrode conductive members 31 in the flat winding electrode assembly 14 of Embodiment 1 will be described in detail below. In Embodiment 1, the shapes of the positive electrode conductive members 29 and the negative electrode conductive members 31 may be substantially the same, and the shapes of the positive electrode intermediate member 30 and the negative electrode intermediate member 32 may be substantially the same. The resistance-welding methods are substantially the same as well. Therefore, the positive electrode 11 will be described below as an example.

The positive electrode substrate exposed portion 15 of the flat winding electrode assembly 14 produced as above is divided into two segments from the winding central part to both sides and is collected centering on a quarter of the thickness of the electrode assembly. Subsequently, the positive electrode collector 17 is provided on both surfaces on the outermost periphery side of the positive electrode substrate exposed portion 15. On the inner periphery side of the positive electrode substrate exposed portion 15, the positive electrode intermediate member 30 including the positive electrode conductive members 29 is inserted between the two segments of the positive electrode substrate exposed portion 15 so that respective projections on both sides of the positive electrode conductive members 29 are brought into contact with the positive electrode substrate exposed portion 15. For example, the positive electrode collector 17 is made of an aluminum plate that has a thickness of 0.8 mm.

The positive electrode conductive members 29 held by the positive electrode intermediate member 30 of Embodiment 1 have projections that have, for example, a shape of a circular truncated cone and are formed on two surfaces facing each other on the cylindrical main body. As long as the positive electrode conductive members 29 are made of metal and blockish, any shape such as a cylinder, a prism, and an elliptic cylinder may be adopted. Materials made of copper, copper alloy, aluminum, aluminum alloy, tungsten, molybdenum, etc., may be used as a formation material of the positive electrode conductive members 29. Among the materials made of these metals, the following configurations may be adopted: the projection on which nickel plate is applied; and the projection and its base area formed of metal material that facilitates heat generation such as tungsten and molybdenum and, for example, brazed to the main body of the cylindrical positive electrode conductive members 29 made of copper, copper alloy, aluminum or aluminum alloy.

A plurality of, for example, here two pieces of positive electrode conductive members 29 are integrally held by the positive electrode intermediate member 30 made of resin material. In such a case, the respective electrode conductive members 29 are held so as to be in parallel with each other. The positive electrode intermediate member 30 may have any shape such as a prism and cylinder. However, a landscape prism is desirable in order that the positive electrode intermediate member 30 is stably positioned and fixed between the two segments of the positive electrode substrate exposed portion 15. It is preferable that the corners of the positive electrode intermediate member 30 be chamfered in order not to hurt or deform the soft positive electrode substrate exposed portion 15 even if contacting the positive electrode substrate exposed portion 15. At least a part to be inserted between the two segments of the positive electrode substrate exposed portion 15 may be chamfered.

The length of the prismatic positive electrode intermediate member 30 varies depending on the size of the prismatic nonaqueous electrolyte secondary battery 10, but it may be from 20 mm to tens of mm. The width of the prismatic positive electrode intermediate member 30 may be as much as the height of the positive electrode conductive members 29, but at least both ends of the positive electrode conductive members 29 as welded portions may be exposed. It is preferable that both ends of the positive electrode conductive members 29 protrude from the surface of the positive electrode intermediate member 30, but the positive electrode conductive members 29 do not necessarily protrude. Such a structure enables the positive electrode conductive members 29 to be held in the positive electrode intermediate member 30, and the positive electrode intermediate member 30 to be stably positioned and disposed between the two segments of the positive electrode substrate exposed portion 15.

Subsequently, the flat winding electrode assembly 14, which includes the positive electrode collector 17 and the positive electrode intermediate member 30 holding the positive electrode conductive members 29 disposed therein, is arranged between a pair of resistance welding electrodes (not shown in the drawings). The pair of resistance welding electrodes are each brought into contact with the positive electrode collector 17 disposed on both surfaces of the outermost periphery side of the positive electrode substrate exposed portion 15. An appropriate pressure is then applied between the pair of resistance welding electrodes, thereby performing the resistance welding under predetermined certain conditions. In this resistance welding, the positive electrode intermediate member 30 is stably positioned and disposed between the two segments of the positive electrode substrate exposed portion 15, which improves the dimensional accuracy between the positive electrode conductive members 29 and the pair of resistance welding electrodes, enables the resistance welding to be performed in an accurate and stable state, and curbs variation in the welding strength.

Next, the detailed structure of the positive electrode collector 17 and the negative electrode collector 19 of Embodiment 1 will be described with reference to FIG. 2. As shown in FIGS. 2A and 2B, the positive electrode collector 17 is electrically connected to a plurality of layers of the positive electrode substrate exposed portion 15 stacked on one side edge of the flat winding electrode assembly 14 by the resistance welding method. The positive electrode collector 17 is electrically connected to the positive electrode terminal 18. Likewise, the negative electrode collector 19 is electrically connected to a plurality of layers of the negative electrode substrate exposed portion 16 stacked on the other side edge of the flat winding electrode assembly 14 by the resistance welding method. The negative electrode collector 19 is electrically connected to the negative electrode terminal 20.

The positive electrode collector 17 is produced, for example, by punching out an aluminum plate in a particular shape and bending it. The positive electrode collector 17 has a rib 17a formed on its main body part where the resistance welding is performed with a bundle of the positive electrode substrate exposed portion 15. The negative electrode collector 19 is produced, for example, by punching out a copper plate in a particular shape and bending it. The negative electrode collector 19 also has a rib 19a formed on its main body part where the resistance welding is performed with a bundle of the negative electrode substrate exposed portion 16.

The rib 17a of the positive electrode collector 17 and the rib 19a of the negative electrode collector 19 serve as a shield in order to prevent sputters generated during the resistance welding from entering the inside of the flat winding electrode assembly 14, and as a radiation fin in order to prevent a portion other than the resistance welded portion of the positive electrode collector 17 and the negative electrode collector 19 from being melted by heat generated during the resistance welding. The ribs 17a and 19a are provided at a right angle from the main body of the positive electrode collector 17 and the negative electrode collector 19, respectively, but the angle need not necessarily be vertical. Even a tilt of about ±10° from the right angle brings the same function effect.

In the prismatic nonaqueous electrolyte secondary battery 10 of Embodiment 1, the example shows that two ribs are provided corresponding to the resistance welding position along the longitudinal direction as the rib 17a of the positive electrode collector 17 and the rib 19a of the negative electrode collector 19. However, the configuration is not limited to this case. One rib may be provided, or ribs may be formed on both sides in the width direction. When ribs are formed on both sides in the width direction, their heights may be either the same or different. If their heights are different, it is preferable that the rib around the flat winding electrode assembly 14 be provided at a higher position than the other.

In the prismatic nonaqueous electrolyte secondary battery 10 of Embodiment 1, the positive electrode collector 17 and the negative electrode collector 19 are welded and connected to the flat winding electrode assembly 14 at two points. These two points for the welded connection are formed across the winding central position CP. Thus, the substrate exposed portions are not welded and connected to each other in a region corresponding to the winding central position CP, so that the nonaqueous electrolyte is likely to penetrate the central portion of the flat winding electrode assembly through the region corresponding to the winding central position CP.

Preparation of Positive Electrode

The following describes a specific composition of the positive electrode active material mixture layer 11a and the negative electrode active material mixture layer 12a and a specific composition of the nonaqueous electrolyte used in the prismatic nonaqueous electrolyte secondary battery 10 of Embodiment 1. Lithium nickel cobalt manganese composite oxide represented by $LiNi_{0.35}Co_{0.35}Mn_{0.30}O_2$ was used as the positive electrode active material. This lithium nickel cobalt manganese composite oxide, carbon powder as a conductive agent, and polyvinylidene fluoride (PVdF) as a binding agent were weighed so that the mass ratio would be 88:9:3, and were mixed with N-methyl-2-pyrrolidone (NMP) as dispersion media to produce a positive electrode active material mixture slurry. This positive electrode active material mixture slurry was applied with a die coater onto both sides of the positive electrode substrate of aluminum foil whose thickness was, for example, 15 μm to form the positive electrode active material mixture layer onto both sides of the positive electrode substrate. Next, the resultant object was dried to remove NMP as an organic solvent, and was pressed with a roll press to have a particular thickness. The electrode thus obtained was slit in a particular width on one end of the electrode in the width direction along the whole longitudinal direction to form the positive electrode substrate exposed portion 15 that had no positive electrode active material mixture layer formed onto both sides, and whereby the positive electrode 11 of the structure shown in FIG. 3A was obtained.

Preparation of Negative Electrode

The negative electrode was produced as follows: 98 parts by mass of graphite powder, 1 part by mass of carboxymethylcellulose (CMC) as a thickening agent, and 1 part by mass of styrene-butadiene-rubber (SBR) as a binding agent were dispersed in water to produce a negative electrode active material mixture slurry. This negative electrode active material mixture slurry was applied with a die coater onto both sides of the negative electrode collector of copper foil whose thickness was 10 μm, and was dried to form the negative electrode active material mixture layer onto both sides of the negative electrode collector. Next, the resultant object was pressed with a press roller to have a particular thickness. The electrode thus obtained was slit in a particular width on one end of the electrode in the width direction along the whole longitudinal direction to form the negative electrode substrate exposed portion 16 that had no negative electrode active material mixture layer formed onto both sides, and whereby the negative electrode 12 of the structure shown in FIG. 3B was obtained.

Preparation of Nonaqueous Electrolyte

The nonaqueous electrolyte to be used was produced as follows: as a solvent, ethylene carbonate (EC) and methyl ethyl carbonate (MEC) were mixed with a volume ratio (25° C. and 1 atmosphere) of 3:7; $LiPF_6$ as an electrolyte salt was added to the mixed solvent so that the concentration would be 1 mol/L; and then LiBOB as a lithium salt having an oxalate complex as an anion and $LiPF_2O_2$ were further added so that the concentrations would be 0.1 mol/L and 0.05 mol/L, respectively. The added LiBOB is reacted on the surface of the negative electrode at the initial charge to form a protective covering. Therefore, in the prismatic nonaqueous electrolyte secondary battery 10 of Embodiment 1, all LiBOB added to the nonaqueous electrolyte is not necessarily present in the form of LiBOB. Similarly, $LiPF_2O_2$ also causes a protective covering to be formed on the surface of the positive electrode and the negative electrode at the initial charge and discharge. Therefore, in the prismatic nonaqueous electrolyte secondary battery 10 of Embodiment 1, all $LiPF_2O_2$ added to the nonaqueous electrolyte is not necessarily present in the form of $LiPF_2O_2$.

Production of Prismatic Nonaqueous Electrolyte Secondary Battery

The negative electrode 12 and the positive electrode 11 produced as above were wound while being insulated from each other with the separator 13 interposed therebetween so as to dispose the negative electrode 12 onto the outermost periphery side. Subsequently, the resultant object was formed to be flat, and whereby the flat winding electrode assembly 14 was produced. In the flat winding electrode assembly 14, the winding number of the positive electrode 11 and the negative electrode 12 were 43 and 44, respectively, in other words, the numbers of stacked layers of the positive electrode 11 and the negative electrode 12 were 86 and 88, respectively, and the design capacity was 20 Ah. Furthermore, the total numbers of stacked layers of the positive electrode substrate exposed portion 15 and the negative electrode substrate exposed portion 16 were 86 and 88, respectively. This flat winding electrode assembly 14 was used to produce a prismatic nonaqueous electrolyte secondary battery without the nonaqueous electrolyte poured. Subsequently, the prismatic outer body 25 was vacuum-degassed, a particular amount of the nonaqueous electrolyte produced as above was poured through an electrolyte pour hole 26 provided to the sealing plate 23, and the electrolyte pour hole 26 was then sealed with a blind rivet, thereby preparing the prismatic nonaqueous electrolyte secondary battery 10 of Embodiment 1 that has the structure shown in FIGS. 1 to 3. It is preferable that a pre-charge be performed after pouring the nonaqueous electrolyte and before sealing the electrolyte pour hole 26.

In the nonaqueous electrolyte secondary battery 10 of Embodiment 1, the flat winding electrode assembly has 8 or more layers of the winding portion formed only of the separator in its central portion. This is effective in improving the rate of pouring the nonaqueous electrolyte into the flat winding electrode assembly in the width direction.

In the prismatic nonaqueous electrolyte secondary battery 10 of Embodiment 1, an example of adding LiBOB to the nonaqueous electrolyte as an additive is shown. However, in the present invention, as the lithium salt having an oxalate complex as an anion, lithium difluoro(oxalato)borate, lithium tris(oxalato)phosphate, lithium difluoro(bisoxalato) phosphate, and lithium terafluoro(oxalato)phosphate, for example, may be used.

Embodiment 2

The nonaqueous electrolyte secondary battery 10 of Embodiment 1 shows an example in which the stacked layers of the positive electrode substrate exposed portion 15 and the stacked layers of the negative electrode substrate exposed portion 16 are divided into two segments to interpose therebetween the positive electrode intermediate member 30 including the positive electrode conductive member 29 and the negative electrode intermediate member 32 including the negative electrode conductive member 31, respectively. However, in the invention, it is not necessary to divide the stacked layers of the positive electrode substrate exposed portion 15 or the stacked layers of the negative electrode substrate exposed portion 16 into two segments.

Figure 4A:
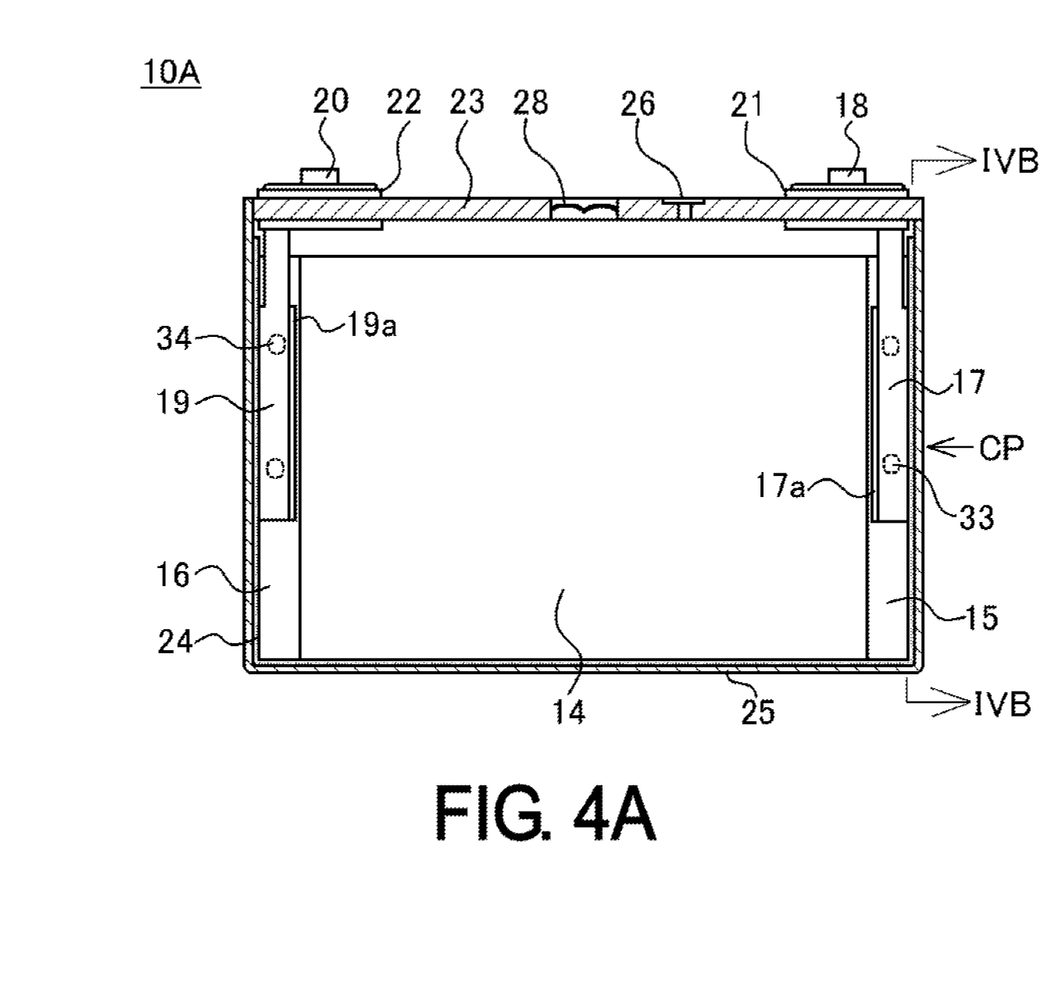
FIG. 4A is a view of a prismatic nonaqueous electrolyte secondary battery in accordance with Embodiment 2 corresponding to FIG. 2A.
Figure 4B:
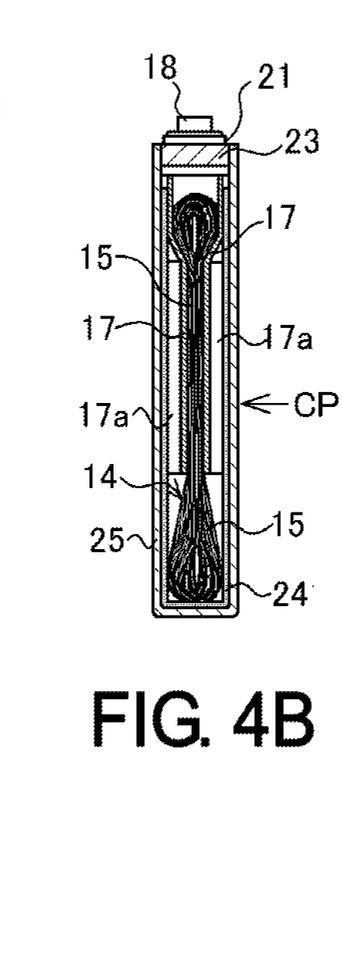
FIG. 4B is a sectional view along line IVB-IVB of FIG. 4A.

A prismatic nonaqueous electrolyte secondary battery 10A in accordance with Embodiment 2 will be described with reference to FIG. 4, in which neither stacked layers of the positive electrode substrate exposed portion 15 nor stacked layers of the negative electrode substrate exposed portion 16 are divided into two segments and neither a positive electrode conductive member nor a negative electrode conductive member is used. In FIG. 4, like numbers are given to like components corresponding to the prismatic nonaqueous electrolyte secondary battery 10 of Embodiment 1 shown in FIG. 2, and the detailed description thereof is omitted. In the flat winding electrode assembly 14 of Embodiment 2, a resistance welded portion between the positive electrode substrate exposed portion 15 and a positive electrode collector 17 and a resistance welded portion between the negative electrode substrate exposed portion 16 and a negative electrode collector 19 are different in formation material but are substantially similar in structure. Thus, FIG. 4B shows a side view of the positive electrode substrate exposed portion 15 as an example, and a side view of the negative electrode substrate exposed portion 16 is not shown.

The flat winding electrode assembly 14 used in the prismatic nonaqueous electrolyte secondary battery 10A of Embodiment 2, as in the case of the prismatic nonaqueous electrolyte secondary battery 10 of Embodiment 1, has 8 layers of the winding portion formed only of the separator in its central portion. The amounts per unit area of a positive electrode active material mixture layer 11a of the positive electrode 11 and a negative electrode active material mixture layer 12a of the negative electrode 12 are larger than those in Embodiment 1. The winding number of the positive electrode 11 and the negative electrode 12 are 35 and 36, respectively. In other words, the total numbers of stacking layers of the positive electrode 11 and the negative electrode 12 are 70 and 72, respectively. The design capacity is 25 Ah. Furthermore, the total numbers of stacking layers of the positive electrode substrate exposed portion 15 and the negative electrode substrate exposed portion 16 are 70 and 72, respectively. On the positive electrode 11 side, the positive electrode collector 17 is disposed on the surfaces of both sides of the outermost side of the stacked layers of the positive electrode substrate exposed portion 15. On the negative electrode 12 side, the negative electrode collector 19 is disposed on the surfaces of both sides of the outermost side of the stacked layers of the negative electrode substrate exposed portion 16. The resistance welding is performed at two points so that weld marks (not shown in the drawings) are formed so as to pass through the whole stacked layer portions of the bundle of the positive electrode substrate exposed portion 15 or the negative electrode substrate exposed portion 16. FIG. 4 shows the weld mark 33 formed at two points in the positive electrode collector 17 by resistance-welding and the weld mark 34 formed at two points in the negative electrode collector 19 by resistance-welding. The rib 17a formed onto the positive electrode collector 17 and the rib 19a formed onto the negative electrode collector 19 are formed across the two resistance welding points.

Embodiment 3

Figure 5A:
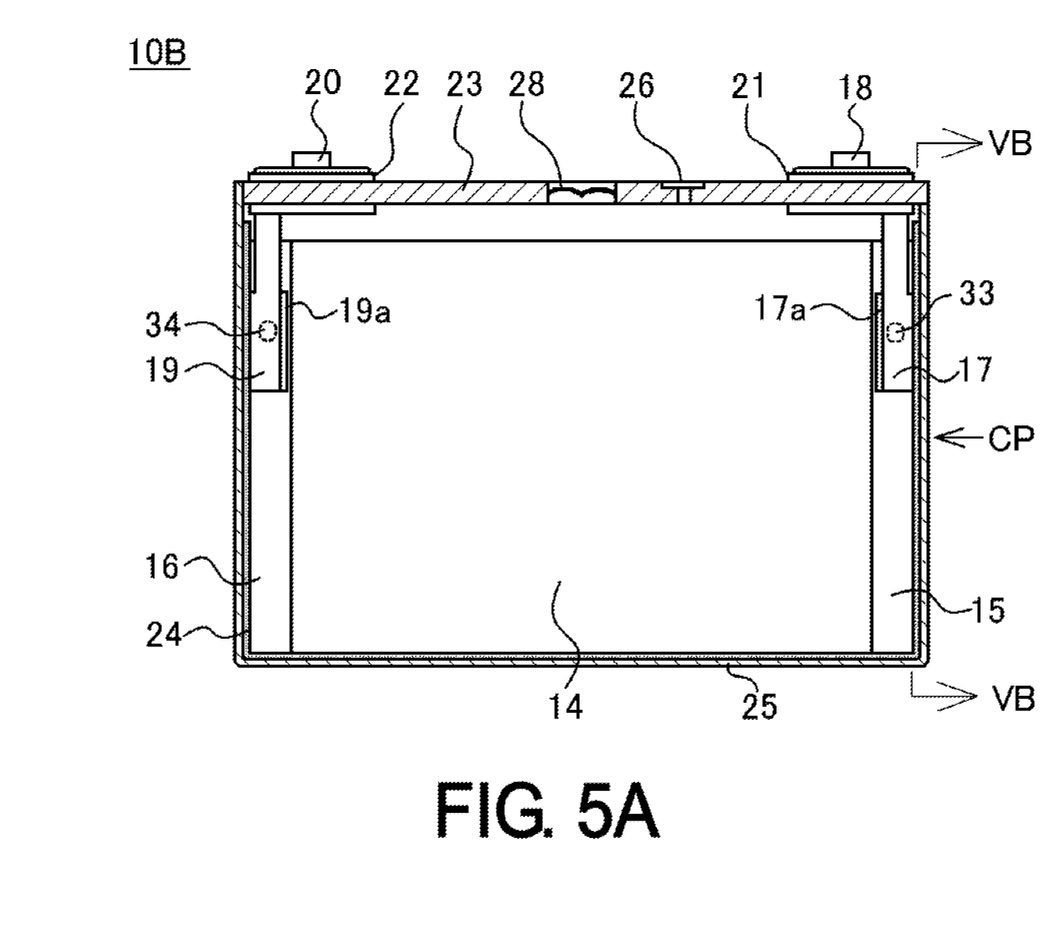
FIG. 5A is a view of a prismatic nonaqueous electrolyte secondary battery in accordance with Embodiment 3 corresponding to FIG. 2A.
Figure 5B:
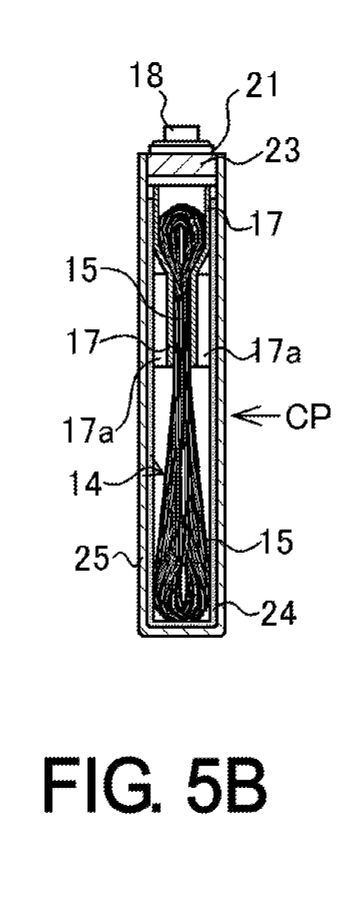
FIG. 5B is a sectional view along line VB-VB of FIG. 5A.

The prismatic nonaqueous electrolyte secondary batteries 10 and 10A of Embodiments 1 and 2 show an example in which the positive electrode collector 17 and the negative electrode collector 19 are welded and connected to a bundle of the positive electrode substrate exposed portion 15 and a bundle of the negative electrode substrate exposed portion 16, respectively, at two points by resistance-welding. However, this welded connection can be made at one point. In contrast to the prismatic nonaqueous electrolyte secondary battery 10A in accordance with Embodiment 2, a prismatic nonaqueous electrolyte secondary battery 10B in accordance with Embodiment 3 will be described with reference to FIG. 5, in which the welded connection is made at one point. In FIG. 5, like numbers are given to like components corresponding to the prismatic nonaqueous electrolyte secondary battery 10A of Embodiment 2 shown in FIG. 4, and the detailed description thereof is omitted. In the flat winding electrode assembly 14 of Embodiment 3, a resistance welded portion between the positive electrode substrate exposed portion 15 and the positive electrode collector 17 and a resistance welded portion between the negative electrode substrate exposed portion 16 and the negative electrode collector 19 are different in formation material but are substantially similar in structure. Thus, FIG. 5B shows a side view of the positive electrode substrate exposed portion 15 as an example, and a side view of the negative electrode substrate exposed portion 16 is not shown.

The flat winding electrode assembly 14 used in the prismatic nonaqueous electrolyte secondary battery 10B in accordance with Embodiment 3 has the same structure as in the prismatic nonaqueous electrolyte secondary battery 10A in accordance with Embodiment 2. On the positive electrode 11 side, the positive electrode collector 17 is disposed on the surfaces of both sides of the outermost side of the stacked layers of the positive electrode substrate exposed portion 15, while being disposed between the central position CP of the flat winding electrode assembly 14 and the sealing plate 23. On the negative electrode 12 side, the negative electrode collector 19 is disposed on the surfaces of both sides of the outermost side of the stacked layers of the negative electrode substrate exposed portion 16, while being disposed between the central position CP of the flat winding electrode assembly 14 and the sealing plate 23. The resistance welding is performed at one point so that a weld mark (not shown in the drawings) is formed so as to pass through the whole stacked layer portions of the bundle of the positive electrode substrate exposed portion 15 or the negative electrode substrate exposed portion 16. FIG. 5 shows the weld mark 33 formed at one point in the positive electrode collector 17 by resistance-welding and the weld mark 34 formed at one point in the negative electrode collector 19 by resistance-welding.

In the prismatic nonaqueous electrolyte secondary battery 10B of Embodiment 3, the bottom end portions of the positive electrode collector 17 and the negative electrode collector 19 (end portions on the prismatic outer body 25 side) are disposed between the central position CP of the winding electrode assembly 14 and the sealing plate 23. This allows the nonaqueous electrolyte to more easily penetrate the central portion of the winding electrode assembly 14. The bottom end portion of one of the positive electrode collector 17 and the negative electrode collector 19 may be disposed between the central position CP of the winding electrode assembly 14 and the sealing plate 23.

Modification

Figure 6:
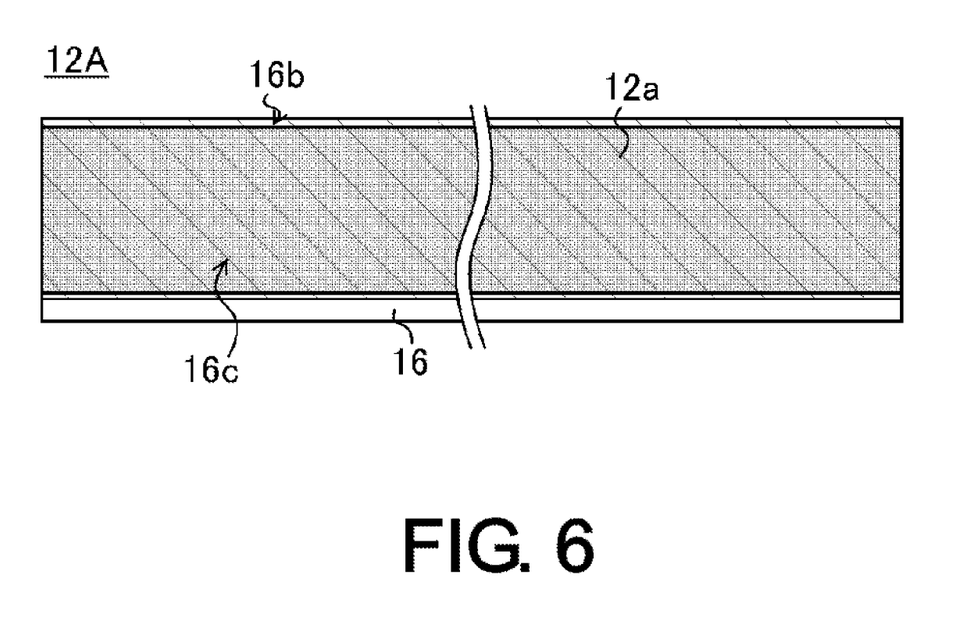
FIG. 6 is a plan view of a negative electrode used in a prismatic nonaqueous electrolyte secondary battery of a modification.

As a modification, an example will be described with reference to FIG. 6, in which negative electrode substrate exposed portions are formed onto both ends of a negative electrode in the width direction (lateral direction).

The nonaqueous electrolyte secondary batteries 10, 10A, and 10B of Embodiments 1 to 3 use the negative electrode 12 that has the negative electrode substrate exposed portion 16 formed onto one end of the negative electrode 12 in the width direction along a longitudinal direction (not shown in the drawings). A negative electrode 12A of the modification, as shown in FIG. 6, has another negative electrode substrate exposed portion 16b formed in a particular width onto both surfaces along a longitudinal direction at the opposite side to the side where the negative electrode substrate exposed portion 16 is formed in the width direction. The negative electrode substrate exposed portion 16b is formed onto both surfaces of the negative electrode 12. The positive electrode 11 (not shown in the drawings) used in the modification has the same size and the same structure as the regular positive electrode 11 used in the nonaqueous electrolyte secondary batteries 10, 10A, and 10B of Embodiments 1 to 3.

Using the negative electrode 12A in such a structure allows heat generated inside the flat winding electrode assembly 14 to be easily released from both ends in the width direction of the negative electrode substrate exposed portions 16 and 16b, and prevents an increase in temperature inside the flat winding electrode assembly 14.

In such a case, it is preferable that a protective layer 16c (a shaded area in FIG. 6) including a metal oxide particle and a binder be formed onto both surfaces of the negative electrode active material mixture layer 12a, of the negative electrode substrate exposed portion 16b additionally formed, and of a part of the negative electrode substrate exposed portion 16 along the part where the negative electrode active material mixture layer 12a is formed. It is preferable that alumina, titania, zirconia, and the like be used as the metal oxide and that an acrylate resin be used as the binder.

In such a structure, the protective layer 16c has porous and insulating properties due to the presence of the metal oxide particle. Consequently, a tiny gap is formed between the negative electrode 12A and a separator 13 in the flat winding electrode assembly 14. Therefore, the nonaqueous electrolyte is more likely to penetrate the central portion of the flat winding electrode assembly 14. In addition, such a structure leads to excellent insulating properties between the negative electrode substrate exposed portion 16b additionally formed and the positive electrode substrate exposed portion 15 facing each other with the separator 13 interposed therebetween, thereby obtaining the nonaqueous electrolyte secondary battery that has excellent reliability.

The prismatic nonaqueous electrolyte secondary batteries 10, 10A, and 10B of Embodiments 1 to 3 show an example in which both the positive electrode 11 and the negative electrode 12 have an off-center welded portion. However, either the positive electrode 11 or the negative electrode 12 may have an off-center welded portion. In the prismatic nonaqueous electrolyte secondary batteries 10, 10A, and 10B of Embodiments 1 to 3, a lithium salt having an oxalate complex as an anion, such as LiBOB, and $LiPF_2O_2$ are added to the nonaqueous electrolyte. An advantageous function effect of the invention can be attained with applications involving a nonaqueous electrolyte having a high viscosity. Only the lithium salt having the oxalate complex as the anion or only $LiPF_2O_2$ included increases the viscosity of the nonaqueous electrolyte. Thus, the invention is applicable to either case as well.

The prismatic nonaqueous electrolyte secondary batteries of Embodiments 1 to 3 and the modification show an example of connecting between the positive electrode substrate exposed portion 15 and the positive electrode collector 17 and between the negative electrode substrate exposed portion 16 and the negative electrode collector 19 by resistance-welding, but the connection can be made by ultrasonic welding or irradiation of high-energy rays such as a laser. Furthermore, different connections may be made on the positive electrode side and the negative electrode side.

The invention claimed is:

1. A nonaqueous electrolyte secondary battery comprising:
    a flat winding electrode assembly formed by winding an elongated positive electrode and an elongated negative electrode with an elongated separator interposed therebetween; and
    an outer body storing the flat winding electrode assembly and a nonaqueous electrolyte,
    the nonaqueous electrolyte containing at least one of a lithium salt having an oxalate complex as an anion and lithium difluorophosphate ($LiPF_2O_2$) at the time of making the nonaqueous electrolyte secondary battery,
    the flat winding electrode assembly having eight or more layers of a winding portion formed only of the separator in the central portion thereof, wherein
    the positive electrode includes a positive electrode substrate exposed portion formed along a longitudinal direction,
    the negative electrode includes a negative electrode substrate exposed portion formed along a longitudinal direction,
    the flat winding electrode assembly includes the positive electrode substrate exposed portion wound on one end and the negative electrode substrate exposed portion wound on the other end,
    at least one of the positive electrode substrate exposed portion and the negative electrode substrate exposed portion is welded with a collector, and
    a welded portion of the collector welded with at least one of the positive electrode substrate exposed portion and the negative electrode substrate exposed portion is deviated from the winding central axis of the flat winding electrode assembly.

2. The nonaqueous electrolyte secondary battery according to claim 1, wherein
    the outer body includes a bottomed prismatic hollow case having an opening portion and a sealing plate sealing the opening portion, and
    the welded portion is located at one point and is deviated from the winding central axis of the flat winding electrode assembly to the sealing plate side.

3. The nonaqueous electrolyte secondary battery according to claim 1, wherein
    the outer body includes a bottomed prismatic hollow case having an opening portion and a sealing plate sealing the opening portion,
    the welded portion comprises a first welded portion and a second welded portion,
    the first welded portion is deviated from the winding central axis of the flat winding electrode assembly to the sealing plate side, and
    the second welded portion is deviated from the winding central axis of the flat winding electrode assembly to the bottom side of the prismatic outer body.

4. The nonaqueous electrolyte secondary battery according to claim 1, wherein
    the winding number of the positive electrode and the negative electrode are each 30 or more.

5. The nonaqueous electrolyte secondary battery according to claim 1, wherein
    the battery capacity is 20 Ah or more.

6. The nonaqueous electrolyte secondary battery according to claim 1, wherein
    at least one of the lithium salt having the oxalate complex as an anion and the $LiPF_2O_2$ is contained in an amount of 0.01 to 2.0 mol/L at the time of making the nonaqueous electrolyte secondary battery.

7. The nonaqueous electrolyte secondary battery according to claim 1, wherein
    the lithium salt having the oxalate complex as an anion is lithium bis(oxalato)borate ($Li[B(C_2O_4)_2]$).

8. The nonaqueous electrolyte secondary battery according to claim 1, wherein
    the negative electrode has the negative electrode substrate exposed portion formed on both ends thereof in a width direction along a longitudinal direction.

9. The nonaqueous electrolyte secondary battery according to claim 1, wherein
    at least one of the positive electrode and the negative electrode has a protective layer including a metal oxide particle and a binder formed on a surface thereof.

10. The nonaqueous electrolyte secondary battery according to claim 1, wherein
    the negative electrode includes the negative electrode substrate exposed portion formed on both ends thereof in a width direction along a longitudinal direction,
    the negative electrode has a protective layer including a metal oxide particle and a binder formed on a surface thereof, and
    the protective layer is formed on both ends of the negative electrode in the width direction along the longitudinal direction and is formed onto both surfaces of the negative electrode substrate exposed portion.

11. The nonaqueous electrolyte secondary battery according to claim 1, wherein
    the outer body includes a bottomed prismatic hollow case having an opening portion and a sealing plate sealing the opening portion,
    the welded portion comprises a first welded portion, a second welded portion, a third welded portion and a fourth welded portion,
    each of the first welded portion and the third welded portion is deviated from the winding central axis of the flat winding electrode assembly to the sealing plate side, and each of the second welded portion and the fourth welded portion is deviated from the winding central axis of the flat winding electrode assembly to the bottom side of the prismatic outer body.

12. A nonaqueous electrolyte secondary battery comprising:
- a flat winding electrode assembly formed by winding an elongated positive electrode and an elongated negative electrode with an elongated separator interposed therebetween; and
- an outer body storing the flat winding electrode assembly and a nonaqueous electrolyte,
- the nonaqueous electrolyte containing at least one of a lithium salt having an oxalate complex as an anion and lithium difluorophosphate ($LiPF_2O_2$), and
- the flat winding electrode assembly having eight or more layers of a winding portion formed only of the separator in the central portion thereof, wherein
  - the positive electrode includes a positive electrode substrate exposed portion formed along a longitudinal direction,
  - the negative electrode includes a negative electrode substrate exposed portion formed along a longitudinal direction,
  - the flat winding electrode assembly includes the positive electrode substrate exposed portion wound on one end and the negative electrode substrate exposed portion wound on the other end,
  - at least one of the positive electrode substrate exposed portion and the negative electrode substrate exposed portion is welded with a collector, and
  - a welded portion of the collector welded with at least one of the positive electrode substrate exposed portion and the negative electrode substrate exposed portion is deviated from the winding central axis of the flat winding electrode assembly.

13. The nonaqueous electrolyte secondary battery according to claim 12, wherein
- the outer body includes a bottomed prismatic hollow case having an opening portion and a sealing plate sealing the opening portion, and
- the welded portion is located at one point and is deviated from the winding central axis of the flat winding electrode assembly to the sealing plate side.

14. The nonaqueous electrolyte secondary battery according to claim 12, wherein
- the outer body includes a bottomed prismatic hollow case having an opening portion and a sealing plate sealing the opening portion,
- the welded portion comprises a first welded portion and a second welded portion,
- the first welded portion is deviated from the winding central axis of the flat winding electrode assembly to the sealing plate side, and
- the second welded portion is deviated from the winding central axis of the flat winding electrode assembly to the bottom side of the prismatic outer body.

15. The nonaqueous electrolyte secondary battery according to claim 12, wherein
- the winding number of the positive electrode and the negative electrode are each 30 or more.

16. The nonaqueous electrolyte secondary battery according to claim 12, wherein
- the battery capacity is 20 Ah or more.

17. The nonaqueous electrolyte secondary battery according to claim 12, wherein
- the lithium salt having the oxalate complex as an anion is lithium bis(oxalato)borate ($Li[B(C_2O_4)_2]$).

18. The nonaqueous electrolyte secondary battery according to claim 12, wherein
- the negative electrode has the negative electrode substrate exposed portion formed on both ends thereof in a width direction along a longitudinal direction.

19. The nonaqueous electrolyte secondary battery according to claim 12, wherein
- at least one of the positive electrode and the negative electrode has a protective layer including a metal oxide particle and a binder formed on a surface thereof.

20. The nonaqueous electrolyte secondary battery according to claim 12, wherein
- the outer body includes a bottomed prismatic hollow case having an opening portion and a sealing plate sealing the opening portion,
- the welded portion comprises a first welded portion, a second welded portion, a third welded portion and a fourth welded portion,
- each of the first welded portion and the third welded portion is deviated from the winding central axis of the flat winding electrode assembly to the sealing plate side, and
- each of the second welded portion and the fourth welded portion is deviated from the winding central axis of the flat winding electrode assembly to the bottom side of the prismatic outer body.

\* \* \* \* \*